(12) United States Patent
Beghini et al.

(10) Patent No.: US 7,811,005 B2
(45) Date of Patent: Oct. 12, 2010

(54) THRUST BEARING DEVICE FOR A VEHICLE SUSPENSION

(75) Inventors: Eric Beghini, La Membrolle sur Choisille (FR); Raphaël Gorette, Danze (FR); Christophe Houdayer, Tours (FR)

(73) Assignee: Aktiebolaget SKF, Göteborg (SE)

( * ) Notice: Subject to any disclaimer, the term of this patent is extended or adjusted under 35 U.S.C. 154(b) by 828 days.

(21) Appl. No.: 10/488,911

(22) PCT Filed: Sep. 10, 2002

(86) PCT No.: PCT/FR02/03077

§ 371 (c)(1),
(2), (4) Date: Aug. 26, 2004

(87) PCT Pub. No.: WO03/022606

PCT Pub. Date: Mar. 20, 2003

(65) Prior Publication Data

US 2005/0008276 A1    Jan. 13, 2005

(30) Foreign Application Priority Data

Sep. 12, 2001    (FR) ................................... 01 11806

(51) Int. Cl.
F16C 19/10    (2006.01)
B60G 15/00    (2006.01)

(52) U.S. Cl. ................................ 384/609; 280/124.155

(58) Field of Classification Search ................ 384/609, 384/611, 614, 615, 617; 267/179, 220; 280/124.147, 280/124.155, 124, 147, 155
See application file for complete search history.

(56) References Cited

U.S. PATENT DOCUMENTS 4,029,186 A    6/1977    De Gennes (Continued)

FOREIGN PATENT DOCUMENTS

DE    4228899    3/1994

(Continued)

OTHER PUBLICATIONS

Preliminary Search Report for FR 0310483 completed on Apr. 1, 2004 (2 pages).

(Continued)

*Primary Examiner*—Thomas R Hannon
*Assistant Examiner*—James Pilkington
(74) *Attorney, Agent, or Firm*—Meyertons, Hood, Kivlin, Kowert & Goetzel, P.C.; Eric B. Meyertons

(57) ABSTRACT

The invention concerns a vehicle thrust bearing comprising a rolling bearing forming a stop element (8), a support spring retainer (11), and an elastic support block (2), the rolling bearing including an upper race (12) arranged in an annular upper cap (16) forming a contact surface between said upper race (12) and the elastic block (2), a lower race (13). The device comprises an annular lower cap (17) forming a contact surface between the lower race (13) and the support spring retainer (11). The caps (16, 17) comprise each a thick portion (18, 22) and a thin portion (19, 23), the thin portion (19, 23) being located axially opposite the thick portion (22, 18) of the other cap, the lower (13) and upper (12) races being urged to be pressed on the thick portions (22, 18) of the lower (17) and upper (16) caps forming a rolling bearing with oblique contact.

23 Claims, 3 Drawing Sheets

U.S. PATENT DOCUMENTS

| | | |
|---|---|---|
| 4,046,238 A | 9/1977 | Mendoza-Orozco |
| 4,319,220 A | 3/1982 | Pappas et al. |
| 4,400,041 A * | 8/1983 | Lederman .................. 384/607 |
| 4,435,890 A * | 3/1984 | Ernst et al. ............. 29/898.066 |
| 4,478,595 A | 10/1984 | Hayakawa et al. |
| 4,497,523 A * | 2/1985 | Lederman .................. 384/615 |
| 4,541,744 A * | 9/1985 | Lederman .................. 384/607 |
| 4,601,374 A | 7/1986 | Ladin |
| 4,608,741 A | 9/1986 | Mallet |
| 4,641,523 A | 2/1987 | Andreasson |
| 4,699,530 A | 10/1987 | Satoh et al. |
| 4,722,617 A * | 2/1988 | Stella et al. ................ 384/523 |
| 4,815,867 A | 3/1989 | Ladin |
| 4,854,436 A | 8/1989 | Lassiaz et al. |
| 4,872,768 A | 10/1989 | Brandenstein et al. |
| 4,874,073 A | 10/1989 | Tagawa |
| 4,881,629 A | 11/1989 | Gay et al. |
| 4,925,323 A * | 5/1990 | Lederman .................. 384/607 |
| 4,946,295 A | 8/1990 | Hajzler |
| 4,957,133 A | 9/1990 | Linz et al. |
| 4,995,737 A * | 2/1991 | Moller et al. ............... 384/607 |
| 5,008,647 A | 4/1991 | Brunt et al. |
| 5,018,384 A | 5/1991 | Hayashi et al. |
| 5,033,013 A | 7/1991 | Kato et al. |
| 5,264,790 A | 11/1993 | Moretti et al. |
| 5,372,435 A | 12/1994 | Genero et al. |
| 5,575,568 A | 11/1996 | Rigaux et al. |
| 5,592,401 A | 1/1997 | Kramer |
| 5,598,913 A | 2/1997 | Monahan et al. |
| 5,713,577 A | 2/1998 | Lannert et al. |
| 5,721,539 A | 2/1998 | Goetzl |
| 5,780,731 A | 7/1998 | Matsui et al. |
| 5,845,230 A | 12/1998 | Lamberson |
| 5,865,288 A | 2/1999 | Thomire et al. |
| 5,877,431 A | 3/1999 | Hirano |
| 6,011,491 A | 1/2000 | Goetzl |
| 6,013,007 A | 1/2000 | Root et al. |
| 6,035,990 A | 3/2000 | Peschke |
| 6,043,643 A | 3/2000 | Message et al. |
| 6,056,446 A | 5/2000 | Welter et al. |
| 6,109,624 A | 8/2000 | Message et al. |
| 6,160,480 A | 12/2000 | Su-yueh |
| 6,196,552 B1 | 3/2001 | Peterson et al. |
| 6,267,512 B1 | 7/2001 | Liesener et al. |
| 6,323,640 B1 | 11/2001 | Forestiero et al. |
| 6,338,576 B1 | 1/2002 | Girardin et al. |
| 6,415,900 B1 | 7/2002 | Lopez et al. |
| 6,539,336 B1 | 3/2003 | Vock et al. |
| 6,550,755 B2 * | 4/2003 | Ehrhardt et al. ............. 267/286 |
| 6,558,043 B2 * | 5/2003 | Beghini et al. ............. 384/615 |
| 6,611,138 B2 | 8/2003 | Vasiloiu |
| 6,612,749 B2 | 9/2003 | Arnault et al. |
| 6,666,784 B1 | 12/2003 | Iwamoto et al. |
| 6,746,352 B1 | 6/2004 | Poiret et al. |
| 6,814,496 B2 * | 11/2004 | Beghini et al. ............. 384/617 |
| 6,908,229 B2 | 6/2005 | Landrieve et al. |
| 2003/0002764 A1 | 1/2003 | Pflugner et al. |
| 2003/0007631 A1 | 1/2003 | Bolognesi et al. |
| 2004/0013334 A1 | 1/2004 | Landrieve et al. |
| 2004/0141669 A1 | 7/2004 | Landrieve et al. |
| 2004/0154895 A1 | 8/2004 | Thomire et al. |
| 2004/0202392 A1 | 10/2004 | Niarfeix et al. |
| 2005/0008276 A1 | 1/2005 | Beghini et al. |
| 2005/0011717 A1 | 1/2005 | Arnault |
| 2005/0011718 A1 | 1/2005 | Arnault |
| 2005/0089255 A1 | 4/2005 | Debrailly et al. |
| 2005/0124447 A1 | 6/2005 | Message et al. |
| 2005/0165397 A1 | 7/2005 | Faus et al. |
| 2005/0235513 A1 | 10/2005 | Niarfeix |
| 2005/0265646 A1 | 12/2005 | Arnault |
| 2006/0011445 A1 | 1/2006 | Bussit et al. |

FOREIGN PATENT DOCUMENTS

| | | |
|---|---|---|
| DE | 9418459 | 2/1995 |
| DE | 29708535 | 8/1997 |
| DE | 19637585 | 3/1998 |
| DE | 19809074 | 1/1999 |
| DE | 10011820 | 9/2001 |
| DE | 10042677 | 3/2002 |
| DE | 10148388 | 4/2003 |
| EP | 399855 | 11/1990 |
| EP | 0 511 105 | 10/1992 |
| EP | 520853 | 12/1992 |
| EP | 806851 | 11/1997 |
| EP | 823267 | 2/1998 |
| EP | 0 930 505 | 7/1999 |
| EP | 930505 | 7/1999 |
| EP | 0 992 797 | 4/2000 |
| EP | 1146244 | 10/2001 |
| FR | 2 375 484 | 12/1977 |
| FR | 2577291 | 8/1986 |
| FR | 2602872 | 2/1988 |
| FR | 2611244 | 8/1988 |
| FR | 2655735 | 6/1991 |
| FR | 2688560 | 9/1993 |
| FR | 2 744 506 | 8/1997 |
| FR | 2772444 | 6/1999 |
| FR | 2779096 | 12/1999 |
| FR | 2819864 | 7/2002 |
| FR | 2829429 | 3/2003 |
| GB | 1580301 | 12/1980 |
| GB | 2054084 | 2/1981 |
| GB | 2156082 | 10/1985 |
| JP | 6213251 | 8/1994 |
| WO | 9850709 | 11/1998 |
| WO | 0142809 | 6/2001 |
| WO | 02052280 | 7/2002 |
| WO | WO 02/052280 | 7/2002 |
| WO | 2004005937 | 1/2004 |

OTHER PUBLICATIONS

International Search Report PCT/FR 02/03077 mailed Jan. 21, 2003 (2 pages).
U.S. Appl. No. 10/520,384, filed Jan. 3, 2005, entitled "Instrumented Antifriction Bearing and Electrical Motor Equipped Therewith" to Gallion et al.
U.S. Appl. No. 10/548,866, filed Sep. 9, 2005, entitled "Sensor Unit, and Housing Relay for the Production of Said Unit" to Landrieve.
U.S. Appl. No. 10/551,167, filed Sep. 27, 2005, entitled "Portable Measuring Device for use in Sport" to Franck.
U.S. Appl. No. 10/552,375, filed Jan. 18, 2005, entitled "Freewheel Bearing Device and Freewheel Pulley" to Girardin.
U.S. Appl. No. 10/562,476, filed Dec. 21, 2005, entitled "Bearing Support with an Instrumented Movement and Coder for an Information Recorder Unit" to Gallion et al.
English translation of DE 10011820 (1 page).
English translation of DE 10042677 (1 page).
English translation of DE 10148388 (1 page).
English translation of DE 19637585 (1 page).
English translation of DE 29708535 (1 page).
English translation of EP 399855 (1 page).
English translation of EP 511105 (1 page).
English translation of EP 520853 (1 page)
English translation of EP 823267 (1 page).
English translation of FR 2577291 (1 page).
English translation of FR 2602872 (1 page).
English translation of FR 2611244 (1 page).
English translation of FR 2655735 (1 page).
English translation of FR 2688560 (1 page).
English translation of FR 2772444 (1 page).
English translation of FR 2819864 (1 page).

* cited by examiner

THRUST BEARING DEVICE FOR A VEHICLE SUSPENSION

BACKGROUND OF THE INVENTION

1. Field of the Invention

The present invention relates to the field of suspension thrust bearingthrust bearings used, in particular, in motor vehicles on the telescopic suspension struts of the steered wheels.

2. Description of the Relevant Art

A suspension thrust bearing usually includes an upper race and a lower race between which are placed rolling elements, in the form of balls or rollers.

A suspension thrust bearing is usually placed at the top of the suspension strut between a lower metal cup that also acts as a seat for a suspension spring, and an upper element secured to the vehicle body. The spring of the suspension device is installed around the rod of the damper piston whose end is secured to an elastic support block. The suspension thrust bearing allows a rotating motion between the spring cup, able to rotate, and the elastic support block that is attached to the vehicle body. The relative angular movement between the spring cup and the elastic block is the result of a turning of the steered wheel and/or the compression of the suspension spring.

The suspension thrust bearing also transmits the axial loads between the spring and the vehicle body.

From document FR 2,779,096, a suspension thrust bearing device is known in which the rolling bearing includes an upper race placed inside a cap in contact with the elastic support block and a lower race in direct contact with the cup. The rolling bearing includes a cage fitted with sealing lips to seal the bearing.

However, the bearing seal thus obtained is not satisfactory. Specifically, the suspension thrust rolling bearings are situated under the vehicle body and in the near vicinity of the wheels which, particularly during rainy weather, splash pollutants likely to enter the bearing.

Pollution of the bearing by external elements may, in the long run, adversely affect the operation of the bearing.

SUMMARY

Described herein is a suspension thrust rolling bearing that is very tightly sealed while remaining axially and radially compact.

In one embodiment, a suspension thrust rolling bearing capable of transmitting both axial and radial loads while correctly distributing the loads is described.

Finally, a suspension thrust rolling bearing with a high degree of imperviousness that may easily be assembled, cannot be dismantled and is cheap to fabricate is also described.

A vehicle suspension thrust bearing device is of the type including an angular contact rolling bearing forming a thrust bearing, a cup for a spring, and an elastic support block, the rolling bearing being placed between the cup and the elastic support block secured to the vehicle chassis. The rolling bearing includes an upper race placed inside an upper annular cap forming an interface between said upper race and the elastic block with which the upper cap is in contact, a lower race, and rolling elements placed between raceways of the upper and lower races. The suspension thrust bearing device includes an annular lower cap forming an interface between the lower race and the cup with which the lower cap is in contact. The lower and upper caps each include a thick portion and a thin portion, the thin portion of one cap being situated axially opposite the thick portion of the other cap, the lower and upper races bearing against the thick portions of the lower and upper caps thereby forming an angular contact rolling bearing.

The placing of a thick portion opposite a thin portion makes it possible to produce an angular contact rolling bearing of reduced axial and radial bulk. The particular shape of the caps including a thick portion and a thin portion provides a good distribution of the loads from a cap to the cup or from a cap to the elastic support block while facilitating the formation on the caps of sealing means and/or the placing of separate seals, to protect the suspension thrust rolling bearing effectively.

Advantageously, one race has an external diameter substantially equal to the internal diameter of the other race, so that the lower and upper races may be obtained from one and the same blank to reduce their fabrication cost. With such a race configuration, it is easy to obtain an angular contact rolling bearing with good operational qualities.

The ratio between the internal diameter of one outer race and the external diameter of the other race lies between 1 and 1.05. Depending on the orientation of the rolling bearing angular contact, the upper race is the race with the larger average diameter, or the lower race is the race with the larger average diameter.

In an embodiment, the upper and lower caps define an internal space in which the upper and lower races are located, the upper and lower caps including sealing means to seal the internal space. The lower cap cooperates with the upper cap to form an internal space in which the rolling bearing of the suspension thrust bearing device lies and is thus protected. The means of sealing the upper and lower caps interact to ensure that the bearing is protected against the ingress of external pollutants.

In one embodiment, a cap including a skirt extending axially toward the other cap and radially limiting the internal space, while forming a narrow sealing passage with the other cap. The presence of the skirt radially encloses, at the inner or outer periphery, the internal space defined between the upper and lower caps. The skirt forms a sealing means cooperating with the other cap to seal the internal space by means of a narrow radial and/or axial passage.

One cap includes means of axial retention with the other cap. This produces a compact assembly that cannot be dismantled and may be easily handled without the risk of being accidentally dismantled by an operator.

In one embodiment, one cap includes a radially elastic lip extending toward a skirt of the other cap thereby forming a narrow passage and interacting with a radial flange of the skirt to allow an axial motion in one direction while preventing an inverse axial motion. The lip interacts with the skirt to produce a means of sealing the internal space. The skirt interacts with the radial flange to produce a means of axial retention between the upper cap and the lower cap. The skirt therefore performs a dual function of axial retention and of sealing, capable of being produced at low cost and of allowing easy assembly of the suspension thrust rolling bearing and ensuring that the suspension thrust rolling bearing cannot be accidentally dismantled.

To further improve the sealing of the rolling bearing, the suspension thrust bearing device may include a seal placed on one cap, for example in an annular rib, and having a lip in contact with a radial portion of the race placed on the other cap, or with the other cap. If necessary, each cap may include a seal interacting with the race placed on the other cap or directly with the other cap. Hence, a seal provides improved imperviousness, the means of sealing between the upper and lower caps providing additional sealing.

Advantageously, a seal is injection overmolded onto one cap or dual injection molded at the same time as the cap.

Another embodiment relates to a method of fabricating a rolling bearing including a lower race and an upper race, in which, in a thin annular cup, two annular races provided with toroidal portions are formed, these portions having surfaces with, in cross section, a concave profile, said surfaces being suitable for forming raceways, one race having an internal diameter substantially equal to the external diameter of the other race, the races being connected, the races are separated, and the recess radius of at least one race and/or the internal diameter of the larger diameter race is reduced.

This fabrication method can easily be applied to a suspension thrust bearing device: the races are secured with lower and upper annular cups, rolling elements are placed between the races to form a suspension rollingbearing, the bearing is placed between a cup of a spring and an elastic support block secured to the vehicle chassis, the upper cap forming an interface between said upper race and the elastic block with which it is placed in contact, the lower cap forming an interface between the lower race and the cup with which it is placed in contact, each cap including a thick portion and a thin portion, the thin portion of one cap being situated axially opposite the thick portion of the other cap, the lower and upper races bearing against the thick portions of the lower and upper caps thereby forming an angular contact rolling bearing. The races easily enable the fabrication of an angular contact rolling bearing that may take axial and radial loads.

BRIEF DESCRIPTION OF THE DRAWINGS

The present invention and its advantages will be better understood by studying the detailed description of some embodiments taken as nonlimiting examples and illustrated by the appended drawings wherein.

Figure 1:
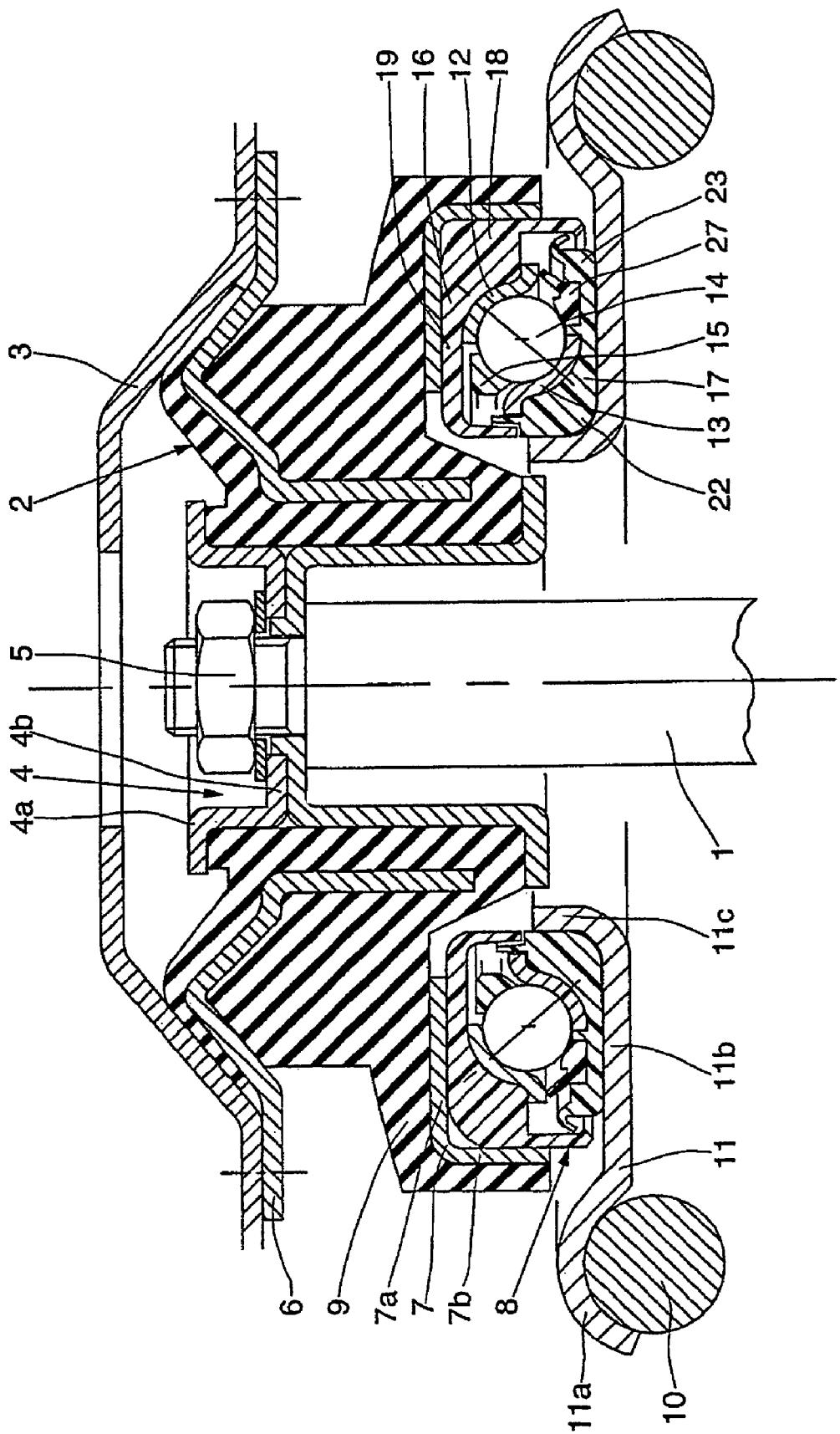
FIG. 1 is a view in axial section of a suspension thrust bearing device in the assembled state.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

In FIG. 1, a damper includes a cylinder, not shown, in which a piston can slide whose rod 1 is linked at its top end to an elastic support block 2 which bears against an element of the chassis 3 forming a seat while being secured to the latter. The elastic support block 2 includes an internal annular link element 4 made up of two portions 4a and 4b onto which the end of the damper piston rod 1 is mounted by means of a nut 5, an annular external link element 6 used for securing to the chassis 3, an annular upper cup 7 acting as a seat for the thrust bearing 8, a rubber block 9 bonded to the surface of these three parts and forming a link between the latter with filtration of vibrations.

The external linking element 6 is attached to the chassis 3, for example by screwing or bolting. The upper cup 7 is placed axially on the internal linking element 4, but is of greater diameter. Also shown is the suspension spring 10 the top of which bears against a lower annular cup 11 which, in turn, bears against the thrust bearing 8.

The upper cup 7 includes a radial portion 7a and a cylindrical axial portion 7b extending from the larger diameter portion of the radial portion 7a. The upper surface of the radial portion 7a and the external surface of the cylindrical portion 7b are in contact with the rubber block 9 of the elastic support block 2.

The lower cup 11 includes a recess 11a in which the end of the spring 10 rests, a radial portion 11b extending radially inward from the recess 11a and a cylindrical portion 11c extending axially toward the upper cup 7a from the free inner edge of the radial portion 11b.

Figure 2:
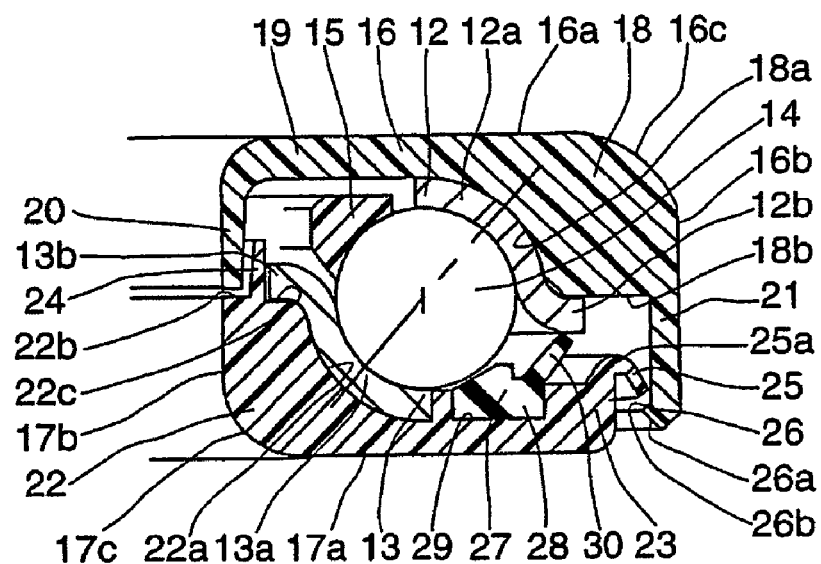
FIG. 2 is a view of the suspension thrust bearing according to FIG. 1.

The suspension thrust bearing 8, more clearly visible in FIG. 2, includes an upper race 12 and a lower race 13, between which are housed rolling elements 14, balls in this instance, retained circumferentially, regularly spaced by a cage 15 of synthetic material. The upper race 12 and lower race 13 are formed of steel plate by cutting and pressing.

The upper race 12 includes a toroidal portion 12a having in cross section an internal concave quarter circle profile suitable for forming a toric raceway for balls, said toroidal portion 12a being extended outward by a radial portion 12b, extending from one lower edge of the toroidal portion 12a.

The lower race 13 includes a toroidal portion 13a having in cross section an internal concave quarter circle profile suitable for forming a toric raceway for balls, said toroidal portion 13a being extended inward by a radial portion 13b, extending from one upper edge of the toroidal portion 13a. The internal diameter of the upper race 12 is substantially equal to the external diameter of the lower race 13.

The suspension thrust bearing 8 includes an upper annular cap 16 and a lower annular cap 17 of synthetic material such as a glass-fiber-filled polyamide. The upper cap 16 includes a first portion and a second portion wherein the first portion has a thickness that is greater than the second portion. The upper cap 16 includes a thick peripheral portion (e.g., a first portion) 18 extended radially inward by a thin radial portion (e.g., a second portion) 19 of lesser thickness, from the top of the thick portion 18.

The thick portion 18 includes a radial surface 18b oriented toward the lower cap 17 and a toroidal internal surface 18a with, in cross section, a concave profile oriented toward the lower cap 17 and radially inward, the internal surface 18a connecting the thick portion 18 to the thin portion 19. The thick portion 18 is of a thickness that reduces radially inward. The upper cap 16 comprises an upper radial surface 16a and an external cylindrical surface 16b that are connected by a rounded bevel 16c.

The upper cap 16 includes an internal skirt 20 extending axially toward the lower cap 17 from the area of lesser diameter of the thin portion 19. The cap 16 also includes an external skirt 21 extending axially toward the lower cap 17 from the area of greater diameter of the thick portion 18.

The thick portion 18 is of a shape that mates with the upper race 12, the convex external surface of the toroidal portion 12a bearing against the toroidal internal surface 18a of the thick portion 18, and the substantially radial portion 12b projecting over the radial surface 18b of the thick portion 18.

The lower cap 17 includes a first portion and a second portion wherein the first portion has a thickness that is greater than the second portion. The lower cap 17 includes a thick portion (e.g., a first portion) 22 of lesser diameter extended radially outward and from a lower edge of the thick portion 22, via a thin radial portion (e.g., a second portion) 23 of lesser thickness. The thick portion 22 includes an external surface 22a with, in cross section, a concave profile oriented outward, the external surface 22a connecting the thick portion 22 to the thinner portion 23. The thick portion 22 is of a thickness that reduces radially toward the outside. The lower cap 17 includes a lower radial surface 17a and a cylindrical internal surface 17b which are connected by a rounded bevel 17c.

The thick portion 22 is of a shape that mates with the lower race 13, the concave profile internal surface of the toroidal portion 13a bearing against the external surface 22a of the thick portion, the radial portion 13b slightly overlapping the thick portion 22 of the lower cap 17.

The lower cap 17 includes an annular rib 24 extending axially toward the upper cap 16 from the thick portion 22. The diameter of the annular rib 24 is greater than the diameter of the internal cylindrical surface 17b, while being less than the diameter of the lesser diameter area of the external surface 22a. The lower cap 17 includes a radial surface 22b situated between the cylindrical surface 17b and the annular rib 24, and a radial surface 22c situated between the annular rib 24 and the top edge of the external surface 22a. The radial portion 13b of the lower race 13 overlaps the radial surface 22c coming radially close to the annular rib 24.

The internal skirt 20 of the upper cap 16 extends axially close to the radial surface 22b thereby forming a narrow radial passage. The external skirt 20 surrounds the annular rib 24 thereby forming a narrow axial passage. Thus, the skirt 20 interacts with the annular rib 24 to form a narrow passage means of sealing between the lower cap 17 and the upper cap 16.

The internal skirt 20 has an internal diameter substantially equal to the internal diameter of the thick portion 22 of the lower cap 17.

The cap 17 includes a radially elastic lip 25, extending obliquely outward from the surface of an annular flange 25a formed at the end of greater diameter of the portion of lesser thickness 23, and coming into contact with or close to the internal surface of the external skirt 21 of the upper cap 16. The lip 25 extends radially outward and axially on the opposite side to the upper cap 16. The lip 25 makes it possible to produce a narrow passage or, where appropriate, a friction contact means of sealing between the upper cap 16 and lower cap 17.

The external skirt 21 includes at its opposite axial end to the upper cap 16 an annular flange 26 extending radially inward. The annular flange 26 allows axial motion in one direction of the lip 25 of the lower cap 17 that deforms radially inward and prevents the lip 25 from moving axially in the opposite direction. Thus, the lower cap 17 may be secured axially to the upper cap 16. The flange 26 includes a truncated cone shaped surface 26a facing away from the upper cap 16 facilitating the deformation of the lip 25 when the lower cap 17 is inserted in the upper cap 16. The flange 26 includes a truncated cone shaped surface 26b facing toward the cap 16 against which surface the lip 25 bears if the lower cap 17 tends to move axially away from the upper cap 16, preventing the lower cap 17 and upper cap 16 from moving axially apart.

The lip 25 has a dual function of sealing and of axial retention. The lip 25, in a single piece with the lower cap 17, may be easily obtained at the same time as the lower cap 17. The lip 25 enables easy assembly and axial retention with axial play where necessary.

The suspension thrust bearing 8 includes a seal 27 including a heel 28 placed and attached in an annular slot 29 of the lower cap 17 and a lip 30 extending radially outward and axially toward the upper cap 16 and coming into friction contact with the radial portion 12b of the upper race. The heel 28 of the seal 27 is situated axially facing the rolling elements 14 surrounding the free edge of the toroidal portion 13a of the lower race 13.

The use of an upper cap 16 and a lower cap 17 allows the formation of an interior space, delimited axially by the upper cap 16 and the lower cap 17 and radially by the inner skirt 20 and outer skirt 21, in which space the races 12, 13 as well as the rolling elements 14 are placed. It is easy to seal off the interior space.

The caps 16, 17 forming an interface respectively between the upper cup 7 and the upper race 12, and between the lower race 13 and the lower cup 11, transmit and distribute the axial and radial loads between the upper cup 7 and lower cup 11. Returning to FIG. 1, the upper cap 16 bears axially by its thick portion 18 and thin portion 19 against the annular portion 7a of the upper cup 7 and is in contact by its thick portion 18 with the cylindrical portion 7b. The thick portion 18 transmits radial and axial loads to the upper cup 7. The thin portion 19 transmits mainly axial loads to the upper cup 7. Similarly, the lower cap 17 bears axially by its thick portion 22 and thin portion 23 against the annular portion 11b of the lower cup 11 and bears radially, by its thick portion 22, against the axial portion 11c.

Where appropriate, the upper cap 16 may be placed in direct contact with the rubber block 9 without using the intermediate upper cup 7.

The lip 25 interacting with the annular flange 26 forms a means of axial retention between the upper cap 16 and the lower cap 17 so as to obtain a suspension thrust bearing 8 that is easy to assemble and cannot be dismantled, so that it can be handled by an operator without risk of accidental dismantling.

Figure 3:
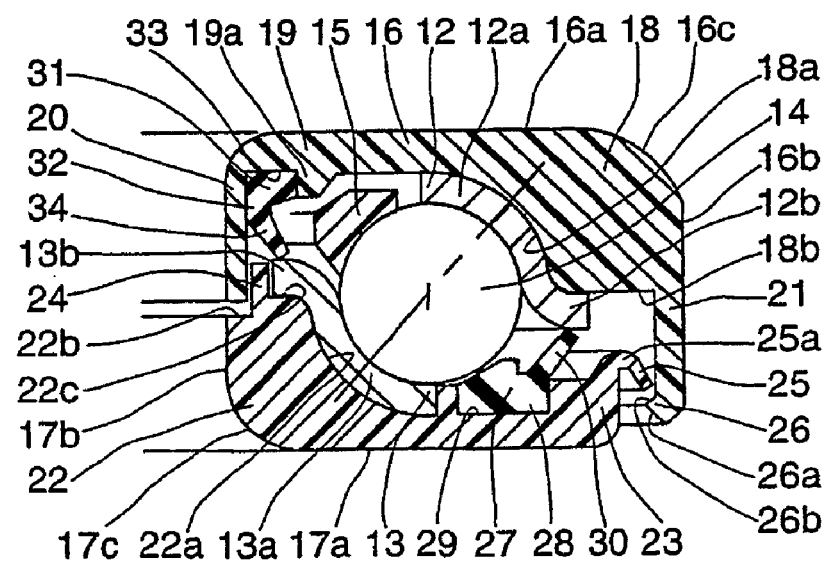
FIG. 3 is a variant of a suspension thrust bearing according to FIG. 2.

To improve the sealing of the suspension thrust bearing 8, and as shown in FIG. 3, a second seal 31 may be installed, this seal having a heel 32 arranged radially in the lesser diameter area of the thin portion 19, attached in an annular slot 33 formed between the interior skirt 20 and an annular flange 19a of the portion of lesser thickness 19 of the upper cap 16, and having a lip 34 extending obliquely, axially toward the lower cap 17 and radially outward and coming into friction contact with the radial portion 13b of the lower race 13. Thus, the seals 31, 27 provide an effective seal, improving the sealing already provided by the sealing means of the upper cap 16 and lower cap 17.

The presence of the thin portions 19, 23 extending radially and axially opposite the thick portions 22, 18 facilitates the attachment of the additional seals 31, 27.

In the embodiment illustrated in FIG. 3, the radial surface 22b is formed at a level axially offset downward relative to the radial surface 22c such that the exterior skirt 21 is more extended axially, the annular rib 24 being less extended axially to allow the passage of the lip 34, while retaining a narrow passage of dimensions similar to the embodiment illustrated before.

In the preceding embodiments, it is easy to obtain the upper cap 16 and lower cap 17 by molding. Advantageously, the seals 27, 31 may be overmolded directly onto the upper and lower caps 16, 17 or be fabricated by dual injection molding at the same time as said caps 16, 17.

Figure 5:
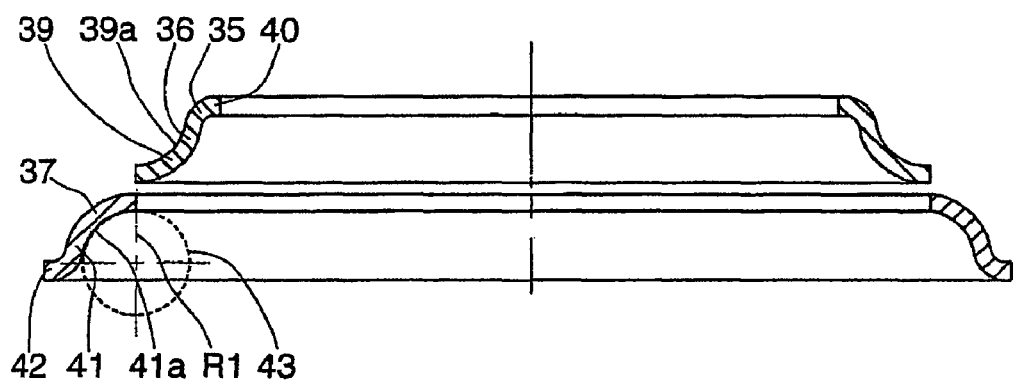
Figure 6:
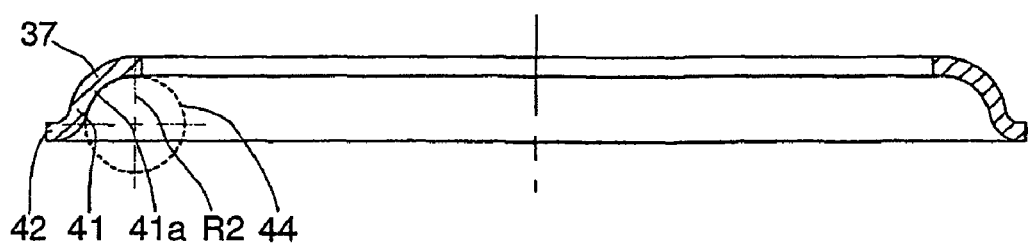

The external diameter of the lower race 13 is substantially equal to the internal diameter of the upper race 12. This particular configuration means that the upper race 12 and lower race 13 may be obtained from one and the same blank, as illustrated in FIGS. 4 to 6.

Figure 4:
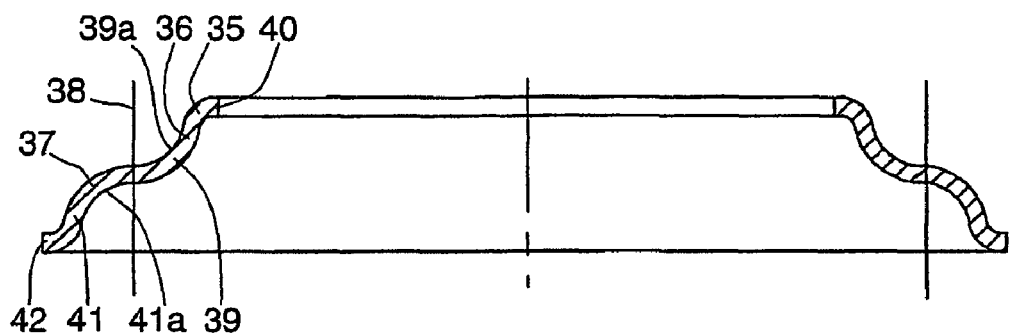
FIGS. 4 to 6 illustrate a method of fabricating two races used in the suspension thrust rolling bearing according to FIGS. 1 to 3.

In FIG. 4, an annular cup 35 made of thin sheet metal, formed for example by cutting and pressing, includes two future races 36, 37 connected together and separated symbolically in FIG. 4 by lines 38. The smaller diameter race 36 includes a toroidal portion 39, whose exterior surface 39a has, in cross section, a concave profile substantially in a quarter circle, and a radial portion 40 extending inward from the area of lesser diameter of the toroidal portion 39.

The race 37 extends from the opposite free edge of the race 36 to the radial portion 40. The race 37 includes a toroidal portion 41 whose inner surface 41a has, in cross section, a concave profile substantially in a quarter circle and includes a radial portion 42 extending outward from the opposite free edge of the race 37 to the race 36.

The concave profile surfaces 39a, 41a of the toroidal portions 39, 41 of the races 36, 37 are suitable for forming raceways for rolling elements of a suspension thrust rolling bearing, balls for example.

To obtain the lower and upper races, the races 36, 37 are separated, for example by means of a blanking punch to cut out the material of the cup 35 in a circle whose center passes through the axis of revolution of the cup 35 and which is delimited radially by the lines 38. A race 36 is obtained of external diameter substantially equal to the internal diameter of the other race 37. The surface with concave profile 39a has a recess radius R1 indicated by a dotted circle 43.

FIG. 6 illustrates the race 37 after an additional forming operation during which the radius of the recess of the race 37 is reduced to obtain a recess radius R2 less than R1, indicated by a dotted circle 44. In the same operation, the internal diameter of the race 37 may be slightly reduced so that the race 37 protrudes radially inward beyond the pitch radius of the rolling bearing formed using the race 37 to ensure that the free edge of the race 37 does not damage the rolling elements in the event of a high axial load. An identical operation may be performed on the race 36.

Preferably, on the finished races, a recess radius R2 of the race 37 should be identical to the recess radius of the race 36, the two recess radii being slightly greater than the radius of the balls of the rolling bearing. Preferably, the ratio between the final internal diameter of the race 36 and the final external diameter of the race 37 is between 1 and 1.05.

Returning to FIGS. 1 to 3, and using the races 36 and 37 whose internal and external diameters have been modified to form the races 13 and 12, the free end of the toroidal portion 12a of the upper race 12 and the free end of the toroidal portion 13a of the lower race 13 should not damage the rolling elements 14 in the event of the transmission of a major axial load by the suspension thrust bearing 8.

The process of fabricating the suspension thrust bearing 8 allows the upper and lower races to be produced from one and the same blank which reduces the cost of fabricating the suspension thrust bearing. In addition, using a simple additional operation, the recess radius of the lower race and/or of the upper race is reduced and the correct behavior of the elements is ensured during the transmission of major axial loads.

A suspension thrust bearing may be obtained including two caps defining an interior space that is sealed by means of sealing of the caps interacting as well as by separate seals. The particular structure of the caps produces a rolling bearing of reduced axial bulk, facilitating the installation of separate seals. The suspension thrust bearing is able to transmit both axial and radial loads, the lower and upper caps providing a good distribution and a better transmission of the loads from the lower cup to the upper cup and vice-versa.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

The invention claimed is:

1. A vehicle suspension thrust bearing device comprising an angular contact rolling bearing forming a thrust bearing, a cup for a spring, and an elastic support block comprising a rubber block, the rolling bearing being placed between the cup and the rubber block secured to a vehicle chassis, the rolling bearing comprising an upper toroidal race placed inside an upper annular cap forming an interface between said upper race and the elastic block with which the upper cap is in contact, a lower toroidal race, and rolling elements placed between raceways of the upper and lower races, the vehicle suspension thrust bearing device further comprising an annular lower cap forming an interface between the lower race and the cup with which the lower cap is in contact, the upper cap comprising a peripheral portion, extended radially inward by a radial portion from the top of the peripheral portion, and ending with internal and external skirts extending axially, said peripheral portion having a toroidal internal surface mating with the upper toroidal race, the lower cap comprising a first portion extended radially outward by a radial portion from a lower edge of the first portion, said first portion having a toroidal external surface mating with the lower toroidal race, the upper cap and lower cap defining an internal space in which the upper race and lower race are located, the upper and lower caps comprising sealing means to seal the internal space, the lower cap comprising a portion of the sealing means in the form of a radially elastic lip comprising inner and outer surfaces extending obliquely outward from a surface of an annular flange toward a portion of the sealing means of the upper cap and cooperating with said upper cap to allow an axial motion in one direction, while limiting an inverse axial motion when a surface of the cooperating portion of the sealing means bears against a surface of said upper cap.

2. The device as claimed in claim 1, wherein one race has an external diameter substantially equal to an internal diameter of the other race, so that the lower race and upper race are obtained from one and the same blank to reduce their fabrication cost.

3. The device as claimed claim 1, wherein the ratio between an internal diameter of one race and an external diameter of the other race lies between 1 and 1.05.

4. The device as claimed in claim 1, wherein the sealing means comprises at least one of the internal and external skirts.

5. The device as claimed in claim 1, wherein the sealing means comprises a seal placed on one cap and having one lip in contact with one radial portion of the race placed on the other cap.

6. The device as claimed in claim 1, wherein the sealing means comprise a seal that is injection overmolded onto one cap or dual injection molded at the same time as the cap.

7. The device as claimed in claim 1, wherein the upper cap further comprises an annular flange comprising a truncated cone shaped surface facing away from the upper cap and a truncated cone shaped surface facing toward the upper cap.

8. The device as claimed in claim 1, wherein one cap of the upper and lower caps comprises a portion of the sealing means extending toward the other cap of the upper and lower caps and radially limiting the internal space, while forming at least one radial and axial sealing passage respectively with the other cap.

9. The device as claimed in claim 1, wherein the sealing means comprises a seal placed on the lower cap having one lip in contact with one radial portion of the race of the upper cap.

10. The device as claimed in claim 9, wherein the sealing means comprises a seal placed on the upper cap having one lip in contact with one radial portion of the race of the lower cap.

11. The device as claimed in claim 1, wherein the radially elastic lip of the lower cap is a sealing lip and extends toward one of the internal and external skirts of the upper cap thereby forming a passage and cooperating with a radial flange of the skirt to allow an axial motion in one direction while preventing an inverse axial motion.

12. An angular contact rolling bearing for a vehicle suspension thrust bearing device, the rolling bearing comprising an upper toroidal race arranged in an annular upper cap, the cap being designed to come into contact with a bearing element thereby forming an interface between said upper race and the bearing element, a lower toroidal race and rolling elements placed between raceways of the upper and lower races, wherein the angular contact rolling bearing further comprises an annular lower cap designed to come into contact with another bearing element thereby forming an interface between the lower race and the other bearing element, the upper cap comprising a peripheral portion, extended radially inward by a radial portion from the top of the peripheral portion, and ending with internal and external skirts extending axially, said portion having a toroidal internal surface mating with the upper toroidal race, the lower cap comprising a first portion extended radially outward by a radial portion from a lower edge of the first portion, said first portion having a toroidal external surface mating with the lower toroidal race, the upper cap and lower cap defining an internal space in which the upper race and lower race are located, the upper and lower caps comprising sealing means to seal the internal space in which the upper race and lower race are located, the lower cap comprising a radially elastic lip comprising inner and outer surfaces extending obliquely outward from a surface of an annular flange toward a portion of the sealing means of the upper cap.

13. The rolling bearing as claimed in claim 12, wherein one race has an external diameter substantially equal to an internal diameter of the other race, so that the lower race and upper race are obtained from one and the same blank to reduce their fabrication cost.

14. The rolling bearing as claimed in claim 12, wherein the ratio between an internal diameter of one race and an external diameter of the other race lies between 1 and 1.05.

15. The rolling bearing as claimed in claim 12, wherein one cap of the upper and lower caps comprises a portion of the sealing means extending toward the other cap of the upper and lower caps and radially limiting the internal space, while forming at least one radial and axial sealing passage respectively with the other cap.

16. The rolling bearing as claimed in claim 12, wherein one cap comprises axial means of retention with the other cap.

17. The rolling bearing as claimed in claim 12, wherein the radially elastic lip of the lower cap is a sealing lip and extends toward one of the internal and external skirts of the upper cap thereby forming a passage and cooperating with a radial flange of the skirt to allow an axial motion in one direction while preventing an inverse axial motion.

18. The rolling bearing as claimed in claim 12, further comprising a seal placed on one cap and having one lip in contact with one radial portion of the race placed on the other cap.

19. The rolling bearing as claimed in claim 12, wherein a seal is injection overmolded onto one cap or dual injection molded at the same time as the cap.

20. The rolling bearing as claimed in claim 12, wherein the upper cap further comprises an annular flange comprising a truncated cone shaped surface facing away from the upper cap and a truncated cone shaped surface facing toward the upper cap.

21. The rolling bearing as claimed in claim 12, wherein the sealing means comprises a seal placed on the lower cap having one lip in contact with one radial portion of the race of the upper cap.

22. The rolling bearing as claimed in claim 21, wherein the sealing means comprises a seal placed on the upper cap having one lip in contact with one radial portion of the race of the lower cap.

23. The rolling bearing as claimed in claim 12, wherein the inner and outer surfaces of the radially elastic lip cooperate with said upper cap to allow an axial motion in one direction, while limiting an inverse axial motion when a surface of the cooperating portion of the sealing means bears against a surface of said upper cap.

* * * * *